April 5, 1966 W. H. McGLADE 3,244,116
VEHICLE AXLE

Filed April 27, 1965 2 Sheets-Sheet 1

INVENTOR.
WAYNE H. McGLADE
BY
RONALD C. KAMP
ATTORNEY

April 5, 1966 W. H. McGLADE 3,244,116
VEHICLE AXLE
Filed April 27, 1965 2 Sheets-Sheet 2

INVENTOR.
WAYNE H. McGLADE
BY
RONALD C. KAMP
ATTORNEY

United States Patent Office 3,244,116
Patented Apr. 5, 1966

3,244,116
VEHICLE AXLE
Wayne H. McGlade, Peoria, Ill., assignor to LeTourneau-Westinghouse Company, Peoria, Ill., a corporation of Illinois
Filed Apr. 27, 1965, Ser. No. 451,175
5 Claims. (Cl. 105—96)

The present invention relates to rail vehicles generally, and more particularly to means for rotatably mounting wheels on such vehicles, and means for driving the wheels.

In the transportation field, the importance and advantages of the rail vehicle have long been recognized. However, little has been done to improve the means for mounting and driving the wheels on a rail vehicle, in spite of the fact that this means of transportation has been in existence for over a century. Most of the efforts to improve reliability and service life have been directed toward the bearing which rotatably mounts the axle on the vehicle. A solid axle has, therefore, been utilized almost universally. This type of axle has several deficiencies. It is heavy and measurably increases the unsprung mass of the vehicle resulting in poor ride characteristics. In addition, the use of a solid axle creates a potential safety hazard. In the event of axle failure, the vehicle which is supported thereon will be dropped into the tracks. Directional control is lost and considerable damage to property, and possibly the loss of life, results. Since the solid axle must resist all bending loads imposed on the vehicle by irregularities in the tracks and must carry the load imparted by the cargo within the vehicle, the axles must be over-designed to avoid risk of failure, especially after long periods of use, thereby resulting in axles which are bulky and extremely heavy.

Another problem which is encountered by utilizing a solid axle results from the curves present in the tracks. As a rail vehicle negotiates a curve, it is obvious that the outer wheel must travel a longer path than the inner wheel. A solid axle requires that both wheels rotate at the same speed. As a result, one wheel must slide along the rail, which decreases the life of the rail and will rapidly wear the steel tire on the sliding wheel. In addition, such sliding produces audible vibrations or noise, which is highly objectional to passengers as well as others outside the vehicle in the vicinity of the curve.

Still another problem encountered is that of "hunting". Normally, the wheels of a rail vehicle are mounted on a truck which is itself attached to the vehicle to permit relative rotation therebetween about a vertical axis. The outer surface or tire of the wheels is tapered slightly, resulting in a larger rolling diameter adjacent the flange which diameter progressively decreases toward the outer edge. Ideally an individual pair of wheels would assume a position on the rails so that the rolling diameters are equal. However, irregularities in the track will laterally displace the wheels slightly causing one wheel to rotate on a diameter larger than the other. With a solid axle, the wheel rolling on the larger diameter will have a higher velocity than the other wheel causing the truck to pivot about a vertical axis toward the slower wheel. The inertia of the truck will carry the wheels past the equilibrium point of equal diameters, so that the previously slower wheel is now rolling a greater diameter. This wheel will now speed up causing the truck to rotate about a vertical axis in the other direction. The above-described cycle will repeat itself, becoming more aggravated as the speed of the vehicle increases. At low speeds this tendency to swing from side to side, within the limits permitted by the flanges, is not objectionable, but at high speeds it becomes critical creating an unstable and potentially dangerous condition.

It is, therefore, an object of the present invention to provide a means for rotatably mounting a wheel on a rail vehicle which is light weight, strong, and which does not render the vehicle inoperative in the event of axle failure.

It is another object of this invention to provide a means for mounting a pair of wheels on a rail vehicle which will permit different speeds thereof in negotiating a curve.

It is still another object of this invention to provide a means for mounting a pair of wheels on a rail vehicle which will permit torque to be transmitted thereto without subjecting the drive means to the static force of the pay load or the bending loads imposed by irregularities in the track.

It is also an object of this invention to provide a vehicle truck which is stable and capable of high speed operations.

These and other objects will become more readily apparent from a perusal of the following description and the accompanying drawings wherein.

Figure 1:
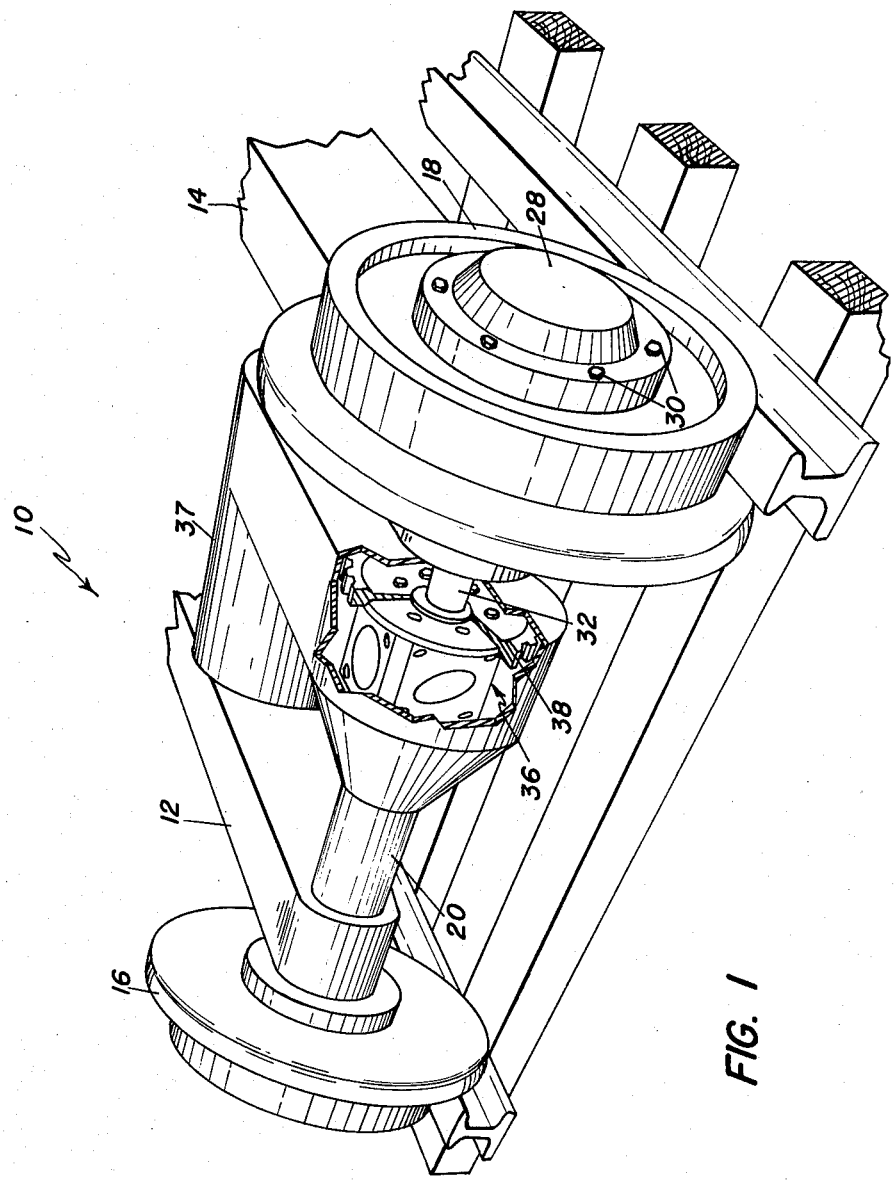
FIG. 1 is a perspective view of a portion of a truck assembly for a rail vehicle incorporating the present invention.

Referring now in detail to FIG. 1, there is shown a truck assembly, indicated generally at 10, having a pair of side frames 12 and 14. Normally, the truck assembly 10 has two pair or sets of wheels, only one pair being shown in the drawings at 16 and 18, wihch are rotatably mounted on the truck 10.

Figure 2:
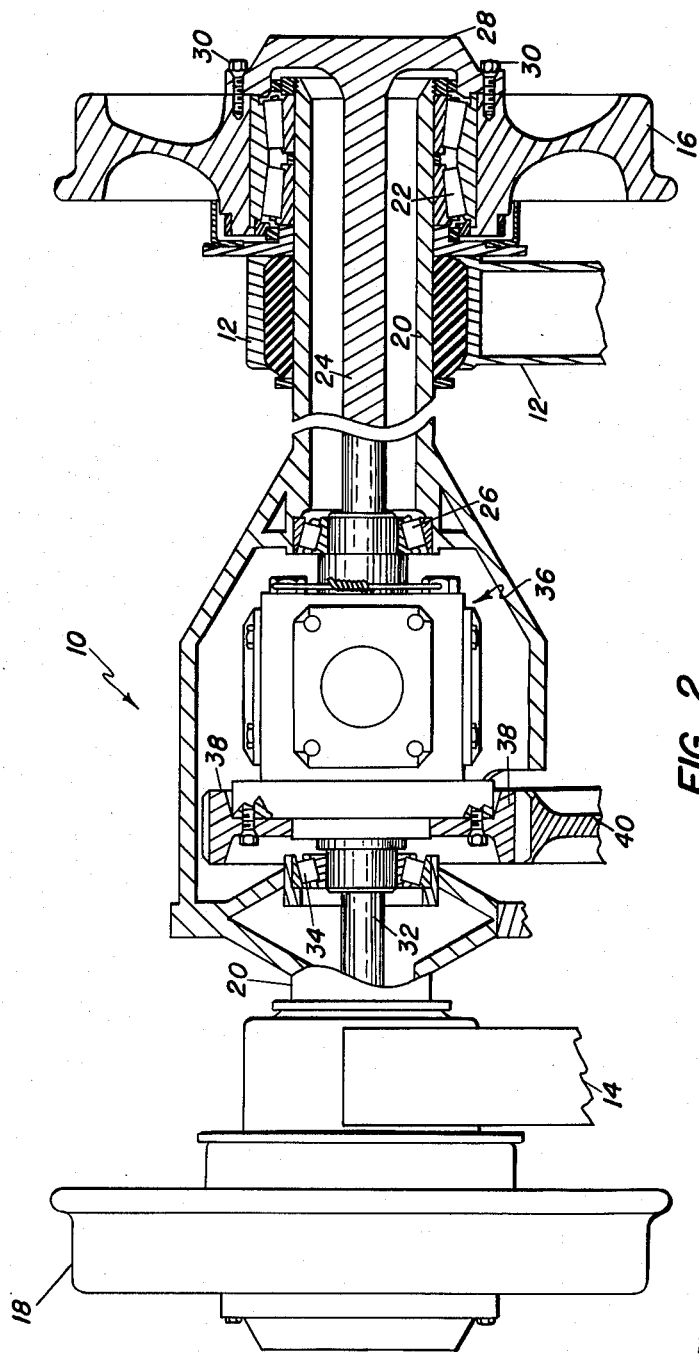
FIG. 2 is a top plan view, partly in section, of the truck assembly shown in FIG. 1.

As is best shown in FIG. 2, the wheel 16 is rotatably mounted on the outer end of the axle housing 20 by means of a bearing 22. The axle housing 20 is secured between the side frames 12 and 14. A split or two-part axle, of which one part is shown at 24, is rotatably mounted within the housing 20 by means of a bearing 26. A connector element 28, which may be formed integral with the axle part 24 as shown or may be formed separately and secured to the axle part, is fastened to the outer surface of the wheel 16, as by bolts 30, for example. The axle part 24 and the element 28 transmit the torque to the wheel 16. A similar arrangement is provided for the wheel 18 by means of the split axle part 32 which is rotatably mounted within the housing 20 on bearing 34.

The axle parts 24 and 32 are connected to the output hubs of a differential, indicated generally at 36. The differential 36 may be of the type commonly utilized in automotive applications, but preferably is of the torque proportioning type, such as that shown in Patent No. 2,415,293. The differential is driven by any suitable power source, such as an electric motor 37, through spur gear 38 attached to the differential input and gear 40 which is the final output from the power source.

As will be evident from FIG. 2, the weight of the vehicle and its contents will be carried by the axle housing 20. The part 24 will be subjected only to the torque imposed by the power source. This structure provides a support means for the vehicle which is fail-safe. That is, if the torque load should cause failure of one of the axle parts 24 and 32, the axle housing 20 would continue to function as the support for the vehicle. Although drive capability would be lost on one wheel, the differential, if of the torque proportioning type, would still permit the other wheel to be driven. On the other hand if the axle housing failed partially, the axle could assume enough of this vertical or static load to permit controlled operation, even though efficient and continuous operation under such circumstances would not be possible. In addition, the differential allows the wheels 16 and 18 to operate on curves without requiring that one of the wheels slide or slip on the rail.

It is apparent that the present invention also provides a support and drive means for a rail vehicle which is relatively light weight, strong and which, in the event of failure, does not render the vehicle totally inoperable.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A vehicle truck capable of operating on a pair of parallel rails, comprising:
   a pair of side frames,
   an axle housing attached to said frames,
   a torque transmitting axle rotatably mounted on the interior of said housing,
   a rail-engaging wheel rotatably mounted on the exterior of said housing,
   and a connecting member secured to the free end of said axle and the wheel.

2. A vehicle truck capable of operating on a pair of parallel rails comprising:
   a pair of side frames,
   an axle housing attached to said frames,
   a two-part axle rotatably mounted in said housing,
   a differential interposed between the parts of the two-part axle and drivingly connected thereto,
   a pair of wheels rotatably mounted on the free ends of said housing,
   and connecting members secured to the free ends of said axle parts and the wheels.

3. A vehicle truck according to claim 1 wherein the differential is of the torque proportioning type.

4. A vehicle truck capable of operating on a pair of parallel rails, comprising:
   a pair of frames,
   a two-part axle rotatably mounted on the frames,
   a wheel connected to the outer end of each part of the axle,
   and a torque proportioning differential interposed between and connected to the axle parts for driving the wheels at different speeds.

5. A vehicle truck capable of operating on a pair of parallel rails, comprising:
   a pair of side frames,
   an axle housing attached to the frames,
   a two-part axle rotatably mounted on the interior of the housing,
   a torque proportioning differential drivingly connected to the adjacent ends of the two axle parts,
   a rail-engaging wheel rotatably mounted on the exterior of the housing,
   and a connecting member secured to the free end of each axle part and its associated wheel.

References Cited by the Examiner

UNITED STATES PATENTS

| | | | |
|---|---|---|---|
| 1,748,309 | 2/1930 | Rose | 104—28 |
| 1,895,368 | 1/1933 | Blackhall | 105—119 |
| 2,036,194 | 4/1936 | Burrows et al. | 105—118 |
| 2,322,149 | 6/1943 | Lewis | 105—117 |
| 2,932,218 | 4/1960 | Russell | 74—711 |

ARTHUR L. LA POINT, *Primary Examiner.*

B. FAUST, *Assistant Examiner.*